United States Patent Office 2,944,043
Patented July 5, 1960

2,944,043

POLYISOBUTYLENE COMPOSITIONS PREPARED WITH A CONDENSATION PRODUCT OF CYCLOHEXANONE WITH METHYL CYCLOHEXANONE

William John G. McCulloch, Plainfield, and Luther B. Turner, Cranford, N.J., assignors to Esso Research and Engineering Company, a corporation of Delaware No Drawing. Filed Aug. 6, 1957, Ser. No. 676,502

2 Claims. (Cl. 260—45.5)

This invention pertains to a new composition of matter and to a method of producing the same.

It is an object of this invention to provide the art with an improved synthetic rubber-like material.

It is also an object of this invention to improve the processability of synthetic rubber-like materials of the type obtainable by polymerization of an isoolefin at low temperature.

It is a further object of this invention to prepare compositions of low temperature isoolefin polymers of improved physical properties.

These and other objects will appear more clearly from the detailed description and claims which follow.

It is known that very valuable rubber-like polymeric substance can be produced by polymerizing an isoolefin of 4 to 5 carbon atoms per molecule, preferably isobutylene, by a low temperature procedure, and in the presence of a solution of a Friedel-Crafts type catalyst in a low-freezing solvent which does not form a complex therewith, such as methyl or ethyl chloride or carbon disulfide. The temperatures applied range from about $-40°$ C. to $-100°$ C. or $-150°$ C. or lower, the preferred range being from $-80°$ C. to $-103°$ C. This polymer has an average molecular weight ranging between 100,000 and 500,000 Staudinger.

One of the major criticisms of this polymer, particularly when the molecular weight thereof is above 80,000 (Staudinger), has been the difficulty encountered in processing it, i.e., rolling or calendering, extruding and the like. For example, attempts have been made to utilize a composition comprising said polymer as insulation on electrical wire by extruding it around a wire core. It has been found unsatisfactory, however, not only because of the low rate at which it can be extruded but also because of the rough appearance of the coated wire obtained. Considerable difficulty has also been encountered in finding addition agents which are capable of improving the polymer and of making it more readily processable.

In order effectively to modify the properties of this polymer, the modifying agent must be a thermoplastic resinous material which is at least partially compatible with the polymer. The latter feature is important in order that the modifying agent will become thoroughly and uniformly blended with the polymer.

It has now been found that the processing of the polymers of an isoolefin may be very markedly facilitated, if there is incorporated therewith a resin obtained by condensing one or more compounds having the formula RR'CO, where R is an alkyl group, an alicyclic group, an alkaryl group, or an aryl group and R' is hydrogen or another alkyl group which may be the same or different than R. For example, an alkyl or aryl alkyl ketone or alicyclic ketone may be condensed with itself or another ketone or with an aldehyde. Thus, furfuryl may be condensed with acetone or methyl ethyl ketone, or an alkyl aromatic phenol such as acetphenone, ethyl phenyl ketone, or methyl naphthyl ketone may be condensed with formaldehyde, or cyclohexanone or its homologs may be condensed with formaldehyde, benzaldehyde or other aldehyde or with another ketone such as methyl cyclohexanone. A particularly suitable resin is Kunstharz AW-2 produced by Badische Anilin und Soda Fabrik by condensing 2 parts of methyl cyclohexanone with 1 part of cyclohexanone in the presence of methyl alcoholic potash under mild conditions. Details for the preparation of these resins are found in German Patents 339,107; 386,013; 402,996; and 403,646 which are included herein by reference.

The resins may be blended with the polymers of an isoolefin in the ratio of from about 2 to about 30 parts by weight of the former with from about 98 to about 70 parts by weight of the latter. The preferred ratio is from 5 to 20 parts of the resin with 95 to 80 parts of rubber. The copolymers and the resin may be mixed in any desired way as by milling on rollers or in a mixer of the Banbury type at a temperature of 250–350° F., preferably 300°–310° F.

Depending upon the use to which the products are to be put, there may be incorporated therewith the usual compounding ingredients, such as fillers, pigments, carbon black and the like in suitable quantities. Small amounts of other polymers, such as polyethylene or polypropylene, may be added if desired. The resultant compositions are characterized by being much easier to work up on milling rollers, calenders, or the like and by being extrudable at a much faster rate than the isoolefin polymer per se.

The following examples serve to illustrate the present invention, but it is to be understood that the invention is by no means limited thereto.

*Example I*

Two parts of methyl cyclohexanone and one part of cyclohexanone were condensed in the presence of ten parts of potassium methylate at a temperature of 200° C. in a shaking autoclave for 16 hours. The resulting resin was purified by treating with steam followed by washing and fusing.

*Example II*

100 parts by weight of isobutylene was diluted with about 200 parts of liquid ethylene at a temperature of about $-95°$ C. to $-100°$ C. A 1% solution of aluminum chloride in ethyl chloride precooled to about $-100°$ C. was then sprayed into this reaction mixture in the ratio of about 1 part of the catalyst solution for each 25 parts of reaction mixture and the whole mixture was thoroughly agitated. The polymerization proceeded with high speed and was complete within a few minutes. The polymerization is exothermic and the heat generated was dissipated by vaporization of the ethylene. The reaction mixture was quenched and the solid copolymer was separated from the residual ethylene and methyl chloride. The resultant copolymer had a molecular weight of about 240,000.

*Example III*

The isobutylene polymer of Example II was milled and a portion of it was extruded as a solid rod without any loading material through an extruder fitted with an 0.4 inch die and 0.3 inch pin.

Other portions of the isobutylene copolymer were mixed with the cyclohexanone resin prepared as described in Example I in accordance with the following recipe:

| | Parts |
|---|---|
| Polyisobutylene | 100 |
| 2,6 di-tertiary butyl p-cresol | 2.0 |
| Cyclohexanone resin | 10 |

After thorough milling each of these samples were extruded through the same extruder under the same temperature conditions, i.e., 90 lbs. of steam on the head and on the barrel. The following results were obtained:

|  | Polybutene | Polybutene + Resin |
|---|---|---|
| Tensile strength, p.s.i. | 3,000 | 2,430 |
| Elongation, percent | 980 | 1,080 |
| Modulus 300 percent | 100 | 240 |
| Modulus 500 percent | 135 | 300 |
| Modulus 700 percent | 495 | 420 |
| Extrusion swell, percent | 114 | 53 |
| Appearance | Very rough | Smooth |
| Extrusion rate, in./min | 50 | 100 |

The above results show that blends of cyclohexanone resins form a readily extrudable composition which has good tensile and elongation properties.

Thus, in accordance with the invention, very high molecular weight polyisobutylenes of 100,000 molecular weight and above are plasticized by the addition of 2 to 30 parts by weight of a cyclohexanone or similar type resin. The products thus obtained swell much less than in the absence of the resin.

The nature of the present invention having been thus fully set forth and specific examples of the same given, what is claimed as new and useful and desired to be secured by Letters Patent is:

1. A composition of matter comprising 70 to 98 parts by weight of a polymer of isobutylene having a molecular weight above 100,000 prepared in the presence of a Friedel-Crafts catalyst and 2 to 30 parts by weight of a resinous condensation product of cyclohexanone with methyl cyclohexanone to provide a mixture with improved processability.

2. A composition of matter comprising 70 to 98 parts by weight of a polymer of isobutylene having a molecular weight above 100,000 prepared in the presence of a Friedel-Crafts catalyst at a temperature between −40° and −150° C. and 2 to 30 parts by weight of a resinous condensation product of cyclohexanone with methyl cyclohexanone prepared in the presence of methyl alcoholic potash to provide a mixture with improved processability.

References Cited in the file of this patent

UNITED STATES PATENTS 2,410,623     Ballard               Nov. 5, 1946